(12) United States Patent
Hutchison et al.

(10) Patent No.: US 9,710,175 B2
(45) Date of Patent: Jul. 18, 2017

(54) MANAGING STORAGE DEVICES HAVING A LIFETIME OF A FINITE NUMBER OF OPERATIONS

(71) Applicant: International Business Machines Corporation, Armonk, NY (US)

(72) Inventors: Gordon D. Hutchison, Hants (GB); Jonathan M. Parkes, Southsea (GB); Nolan Rogers, Chichester (GB); Bruce J. Smith, Emsworth (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

(21) Appl. No.: 14/785,626

(22) PCT Filed: Jan. 17, 2014

(86) PCT No.: PCT/EP2014/050949
§ 371 (c)(1),
(2) Date: Oct. 19, 2015

(87) PCT Pub. No.: WO2014/187574
PCT Pub. Date: Nov. 27, 2014

(65) Prior Publication Data
US 2016/0085459 A1    Mar. 24, 2016

(30) Foreign Application Priority Data
May 20, 2013    (GB) .................................. 1309062.6

(51) Int. Cl.
*G06F 13/00*    (2006.01)
*G06F 3/06*    (2006.01)
(Continued)

(52) U.S. Cl.
CPC .......... *G06F 3/0616* (2013.01); *G06F 3/0653* (2013.01); *G06F 3/0688* (2013.01);
(Continued)

(58) Field of Classification Search
CPC .... G06F 3/0616; G06F 3/0653; G06F 3/0688; G06F 11/008; G06F 11/108;
(Continued)

(56) References Cited

U.S. PATENT DOCUMENTS 7,865,761 B1    1/2011    Chilton
8,010,738 B1    8/2011    Chilton et al.
(Continued)

FOREIGN PATENT DOCUMENTS

WO    2013118170 A1    8/2013

OTHER PUBLICATIONS

International Search Report and Written Opinion from PCT Application No. PCT/EP2014/050949, dated Mar. 3, 2014.
(Continued)

*Primary Examiner* — Reba I Elmore
(74) *Attorney, Agent, or Firm* — Zilka-Kotab, P.C.

(57) ABSTRACT

Disclosed are methods and systems of managing a plurality of storage devices having a lifetime of a finite number of operations. An average number of storage devices reaching said lifetime of a finite number of operations per first unit time is calculated. For each one of the plurality of storage devices an estimated date when a finite number of operations will be reached is calculated. For each date, a variable related to the number of storage devices reaching said finite number of operations within a predetermined period of said date is set. For one or more variables having a value larger than a value calculated using the date and said average number of storage devices reaching said lifetime within the predetermined period of said first unit of time, an action is
(Continued)

carried out to reduce the number of storage devices reaching said lifetime per first unit of time.

20 Claims, 7 Drawing Sheets

(51) Int. Cl.
G06F 11/00 (2006.01)
G06F 12/02 (2006.01)
G06F 11/10 (2006.01)

(52) U.S. Cl.
CPC ........ *G06F 11/008* (2013.01); *G06F 12/0246* (2013.01); *G06F 11/108* (2013.01); *G06F 2212/7204* (2013.01); *G06F 2212/7211* (2013.01)

(58) Field of Classification Search
CPC ......... G06F 12/0246; G06F 2212/7204; G06F 2212/7211
USPC .......... 711/103, 154, 159, 165; 712/14, 225, 712/228
See application file for complete search history.

(56) References Cited

U.S. PATENT DOCUMENTS

| | | | |
|---|---|---|---|
| 8,151,137 B2 | 4/2012 | McKean et al. | |
| 8,214,580 B2 | 7/2012 | Lucas et al. | |
| 8,879,319 B1* | 11/2014 | Cassuto | G11C 16/10 365/185.03 |
| 9,450,876 B1* | 9/2016 | Marr | H04L 47/125 |
| 2008/0313505 A1* | 12/2008 | Lee | G06F 12/0246 714/47.2 |
| 2010/0005228 A1 | 1/2010 | Fukutomi et al. | |
| 2010/0011260 A1* | 1/2010 | Nagadomi | G06F 11/008 714/704 |
| 2010/0257306 A1 | 10/2010 | Kawaguchi | |
| 2010/0297114 A1 | 11/2010 | Zurawski et al. | |
| 2012/0060060 A1* | 3/2012 | Danilak | G11C 16/349 714/37 |
| 2016/0034207 A1* | 2/2016 | Mao | G06F 11/1068 711/103 |

OTHER PUBLICATIONS

Search Report from GB Application No. GB1309062.6, dated Nov. 4, 2013.
Kadav et al, "Differential RAID: Rethinking RAID for SSD Reliability," ACM Transactions on Storage, vol. 6, Issue 2, Jul. 2010.
Mir et al, "A Reliability Enhancement Mechanism for High-Assurance MLC Flash-Based Storage Systems," IEEE 17th International Conference on Embedded and Real-Time Computing Systems and Applications, IEEE, Aug. 28-31, 2011, pp. 190-194.
Zhang et al., "Warped Mirrors for Flash" 29th Symposium on Mass Storage Systems and Technologies (MSST), IEEE, May 6-10, 2013, 12 pages.

* cited by examiner

MANAGING STORAGE DEVICES HAVING A LIFETIME OF A FINITE NUMBER OF OPERATIONS

FIELD OF THE INVENTION

The present invention relates to a method of managing a plurality of storage devices, the storage devices having a lifetime of a finite number of operations. More particularly, the present invention relates to managing the plurality of storage devices to achieve a planned steady state retiral rate of the storage drives.

BACKGROUND

Solid State Drives (SSD) are increasingly being used as storage devices in storage systems due to the advantages they offer such as performance, size and power characteristics. However, they suffer from a limited lifetime because of the limited number of write cycles being possible before block failures start to occur. This limit to the lifetime is more apparent than with traditional hard disk drives. In response, some SSD manufacturers guarantee their drives only for a certain number of writes and some even ultimately slow I/O performance to achieve a specified lifetime within the limit of writes that the hardware can support.

This can lead to a new problem when this technology is used. If a number of SSDs are installed at the same time, then the more these SSDs are run in a balanced way for optimal performance, the more likely that they are to all reach the end of their limited lifetime at around the same time.

FIG. 1 shows a graph of an example percentage of blocks failing in a SSD plotted against the number of write (or Program/Erase) cycles that shows empirically the limited lifetime. Until around 100,000 Program/Erase cycles have been reached, there is a steady, but very low percentage of blocks failing. At around 100,000 Program/Erase cycles, the wear out mechanism starts to become apparent and the percentage of blocks failing starts to increase rapidly. After perhaps another 100,000 Program/Erase cycles, a substantial percentage of blocks are failing. Note that the horizontal scale of FIG. 1 is a logarithmic scale.

This limited lifetime leads to at least two potential problems:

1) If a large number of SSDs are installed at the same time, then a large number of SSD replacements may potentially be required over an unusually short time period in order to maintain the appropriate level of data protection. In a large data centre this may result in a lot of expense within a short time period of time and a lot of work within a short time period for administrators physically having to replace the drives.
2) The effects of multiple SSDs reaching the end of their limited lifetime at the same time in one array is potential data loss. The example failure profile shown in FIG. 1 of an SSD disk increases the probability of concurrent failures when groups of storage devices are run in the 'traditional' balanced way used for hard disk drives.

U.S. Pat. No. 8,214,580 discloses a method for adjusting a drive life and capacity of an SSD by allocating a portion of the device as available memory and a portion as spare memory based on a desired drive life and a utilization. Increased drive life is achieved at the expense of reduced capacity.

U.S. Pat. No. 8,151,137 discloses a storage device having an unreliable block identification circuit and a partial failure indication circuit. Each of the plurality of memory blocks includes a plurality of memory cells that decrease in reliability over time as they are accessed. The unreliable block identification circuit is operable to determine that one or more of the plurality of memory blocks is unreliable, and the partial failure indication circuit is operable to disallow write access to the plurality of memory blocks upon determination that an insufficient number of the memory blocks remain reliable. Write access is removed from blocks of memory in order to allow continued read access to the data.

U.S. Pat. No. 8,010,738 discloses a technique for processing requests for a device. It receives a first value indicating an expected usage of the device prior to failure of the device, a second value indicating a specified lifetime of the device and determines a target rate of usage for the device. It determines a current rate of usage for the device, determines whether the current rate of usage is greater than the target rate of usage and if so, performs an action to reduce the current rate of usage for the device. If the device is part of a data storage system, upon determining that the current rate of usage is greater than the target rate of usage, an amount of a resource of a data storage system allocated for use in connection with write requests for the device is modified.

SUMMARY

Embodiments of the present invention provides a computer-implemented method of managing a plurality of storage devices, the storage devices having a lifetime of a finite number of operations. The method includes: calculating an average number of storage devices reaching the lifetime of a finite number of operations per first unit time by dividing the number of operations per first unit of time that will be executed by the plurality of storage drives by the finite number of operations supported by one of the plurality of storage devices; for each one of the plurality of storage devices calculating an estimated date when the finite number of operations will be reached; for each date, setting a variable associated with that date, the variable being related to the number of storage devices reaching the finite number of operations within a predetermined period of the date; and for one or more variables associated with a date where the value of the variable is larger than a value calculated using the date and the average number of storage devices reaching the lifetime within the predetermined period of the first unit of time, carrying out an action to reduce the number of storage devices reaching the lifetime per first unit of time.

Embodiments of the present invention also provide a system for managing a plurality of storage devices, the storage devices having a lifetime of a finite number of operations. The, system includes: an input/output adapter for receiving requests for data transfers to and/or from the plurality of storage devices; a storage device interface for performing the requests for data transfers to and/or from the plurality of storage devices; and a storage device lifetime management unit for managing the storage devices so as to optimise the number of storage devices reaching the lifetime per first unit of time. The storage device lifetime management unit is configured to calculate an average number of storage devices reaching the lifetime of a finite number of operations per first unit time by dividing the number of operations per first unit of time that will be executed by the plurality of storage drives by the finite number of operations supported by one of the plurality of storage devices. The storage device lifetime management unit is configured to calculate an estimated date when the finite number of operations will be reached for each one of the plurality of storage devices; the storage device lifetime management unit sets a variable associated with each date, the variable being related to the number of storage devices reaching the finite number of operations within a predetermined period of the date. For one or more variables associated with a date where the value of the variable is larger than a value calculated using the date and the average number of storage devices reaching the lifetime within the predetermined period of the first unit of time, the storage device lifetime management unit is configured to carry out an action to reduce the number of storage devices reaching the lifetime per first unit of time.

Embodiments of the present invention further provide a computer program product for managing a plurality of storage devices, the storage devices having a lifetime of a finite number of operations. The computer program product includes a computer readable storage medium having program instructions embodied therewith. The computer readable storage medium is not a transitory signal per se. The program instructions are executable by a computer to cause the computer to perform the method described above.

BRIEF DESCRIPTION OF THE DRAWINGS

Preferred embodiments of the present invention will now be described in more detail, by way of example only, with reference to the accompanying drawings, in which.

DETAILED DESCRIPTION

Figure 1:
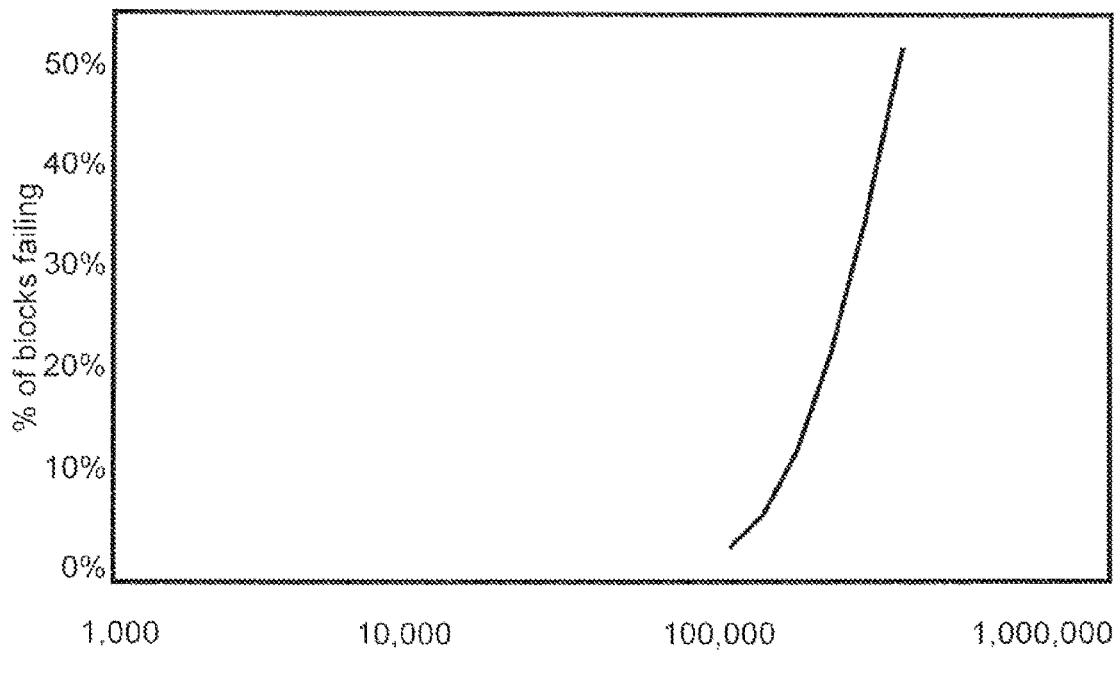
FIG. 1 shows a graph of the percentage of blocks failing plotted against the number of program/erase cycles.

Embodiments of the present invention provides a method of managing a plurality of storage devices, the storage devices having a lifetime of a finite number of operations, the method comprising: calculating an average number of storage devices reaching said lifetime of a finite number of operations per first unit time by dividing the number of operations per first unit of time that will be executed by the plurality of storage drives by the finite number of operations supported by one of the plurality of storage devices; for each one of the plurality of storage devices calculating an estimated date when said finite number of operations will be reached; for each date, setting a variable associated with that date, the variable being related to the number of storage devices reaching said finite number of operations within a predetermined period of said date; for one or more variables associated with a date where the value of the variable is larger than the value calculated using the date and said average number of storage devices reaching said lifetime within the predetermined period of said first unit of time, carrying out an action to reduce the number of storage devices reaching said lifetime per first unit of time. This method provides the advantage that the number of storage devices reaching the end of their lifetime of a finite number of operations may be managed so as to more closely approach a steady state replacement rate of storage devices during each predetermined period.

In a preferred embodiment the method further comprises the step of allocating each one of the plurality of storage devices to one of a plurality of usage tiers, according to how many operations per second unit of time will be executed by each one of the plurality of storage devices; and wherein said action to reduce the number of operations per first unit of time is to exchange a storage device allocated to a usage tier having a larger number of operations per second unit of time with a storage device allocated to a usage tier having a smaller number of operations per second unit of time. This has the advantage of achieving the steady state replacement rate during each predetermined period using a simple organisation of usage tiers.

Preferably, said step of for one or more variables associated with a date where the value of the variable is larger than the value calculated using the date and said average number of storage devices reaching said lifetime within the predetermined period of said first unit of time comprises: selecting the date which has the highest value of the variable associated with it; selecting a first storage device with retiral date closest to the date associated with the selected variable; if the retiral date is one of before or after the date, then identifying any second storage device reaching a retiral date within said first period of said date, but one of respectively after or before said date; if an exchange of said first and second storage devices and their respective tiers would result in a planned retiral date being outside the first period of said date, then identifying the exchange as a potential exchange; repeating said identifying steps until all first storage devices have been considered as potential exchanges; and selecting one or more potential exchanges for implementation.

In another preferred embodiment, said action is one or more of (i) to store more parity information on storage drives reaching said lifetime of a finite number of operations within said predetermined period of said date, but before said date; or (ii) to store less parity information on storage drives reaching said lifetime of a finite number of operations within said predetermined period of said date, but after said date. This has the advantage of achieving the steady state replacement rate during each predetermined period using a simple migration of parity between different storage drives.

In another preferred embodiment, said action is one or more of (i) to migrate extents having a higher number of operations per unit time to storage drives reaching said lifetime of a finite number of operations within said predetermined period of said date, but before said date; or (ii) to migrate extents having a lower number of operations per unit time to storage drives reaching said lifetime of a finite number of operations within said predetermined period of said date, but after said date. This has the advantage of achieving the steady state replacement rate during each predetermined period using a simple migration of extents having a higher number of operations per unit time and extents having a lower number of operations per unit time between storage devices.

Preferably, said variable associated with said date is related to the number of storage devices reaching said finite number of operations within said predetermined period of said date by weighting the number of storage devices reaching said finite number of operations by the time difference between said date and the estimated date when said finite number of operations will be reached. This has the advantage of optimising the selection of storage devices to exchange.

Preferably, said storage devices have a lifetime of a finite number of write operations.

Embodiments of the present invention also provide a system for managing a plurality of storage devices, the storage devices having a lifetime of a finite number of operations, the system comprising: an input/output adapter for receiving requests for data transfers to and/or from the plurality of storage devices; a storage device interface for performing said requests for data transfers to and/or from the plurality of storage devices; a storage device lifetime management unit for managing said storage devices so as to optimise the number of storage devices reaching said lifetime per first unit of time; wherein: said storage device lifetime management unit calculates an average number of storage devices reaching said lifetime of a finite number of operations per first unit time by dividing the number of operations per first unit of time that will be executed by the plurality of storage drives by the finite number of operations supported by one of the plurality of storage devices; said storage device lifetime management unit calculates an estimated date when said finite number of operations will be reached for each one of the plurality of storage devices; said storage device lifetime management unit sets a variable associated with each date, the variable being related to the number of storage devices reaching said finite number of operations within a predetermined period of said date; for one or more variables associated with a date where the value of the variable is larger than the value calculated using the date and said average number of storage devices reaching said lifetime within the predetermined period of said first unit of time, said storage device lifetime management unit carries out an action to reduce the number of storage devices reaching said lifetime per first unit of time.

Embodiments of the present invention further provide a computer program product for managing a plurality of storage devices, the storage devices having a lifetime of a finite number of operations, the computer program product comprising: a computer readable storage medium having computer readable program code embodied therewith, the computer readable program code adapted to perform the method described above.

Figure 2:
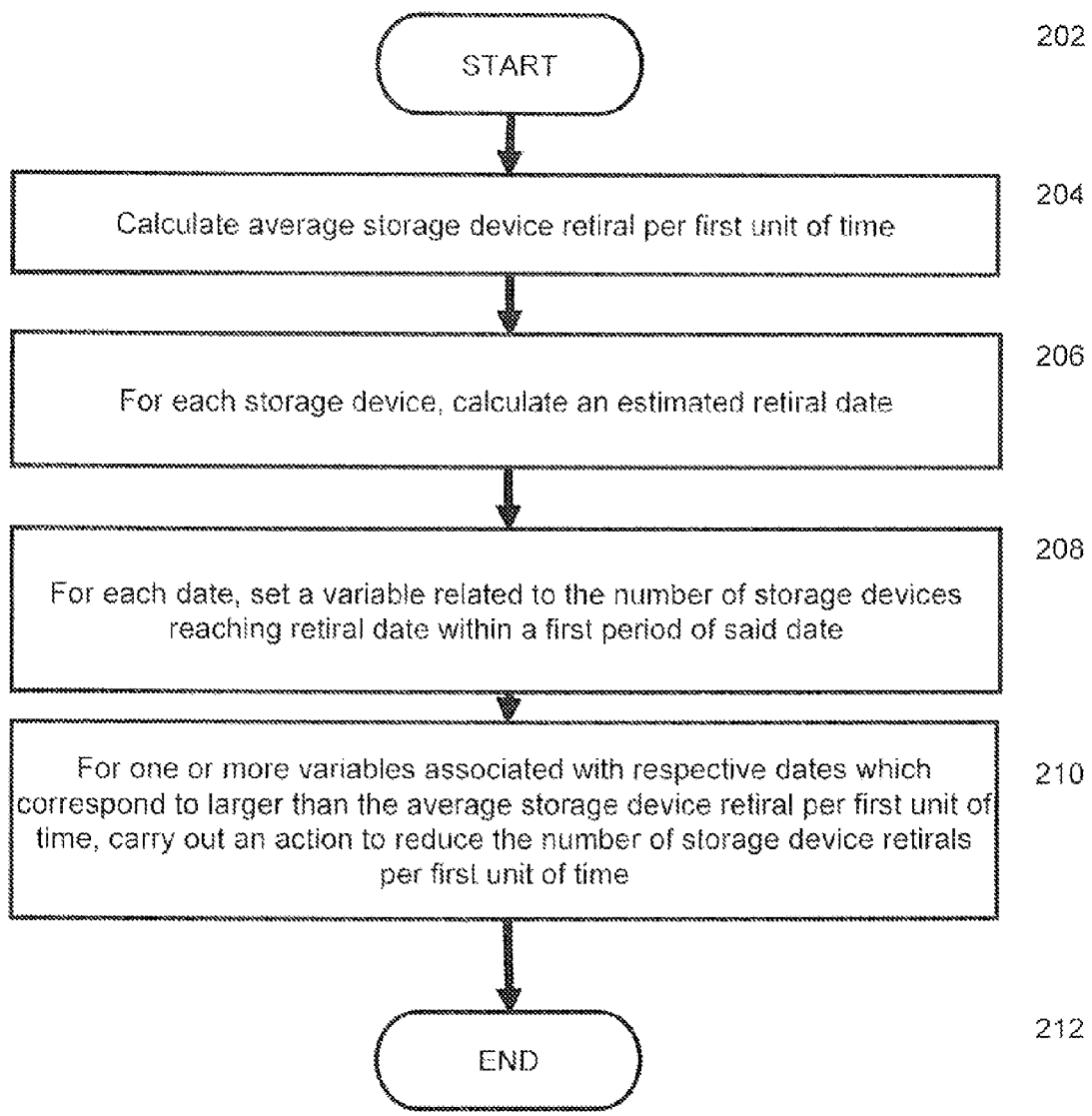
FIG. 2 shows a flow diagram of a first exemplary embodiment of the present invention.

FIG. 2 shows a flow diagram of a first embodiment of the present invention. The method of the embodiment starts at step 202. At step 204, an average storage device retiral per first unit of time is calculated. To calculate this, it is necessary to know the total number of write operations (or Program/Erase cycles) that a storage device can complete before the percentage of blocks failing becomes unacceptable. It is also necessary to know the total number of write operations to be completed in a first unit of time to the totality of the storage devices (820-838 in FIG. 8) in the storage system (800 in FIG. 8). If the total number of write operations to be completed to the totality of the storage devices in a first period of time is divided by the total number of write operations that a storage device can complete before the percentage of blocks failing becomes unacceptable, then the result is the steady state retiral date per first unit of time. Storage drives may choose their actual retiral event when their write count reaches some limit. For example they may choose to fail (in software) or give some other distress signal.

Figure 8:
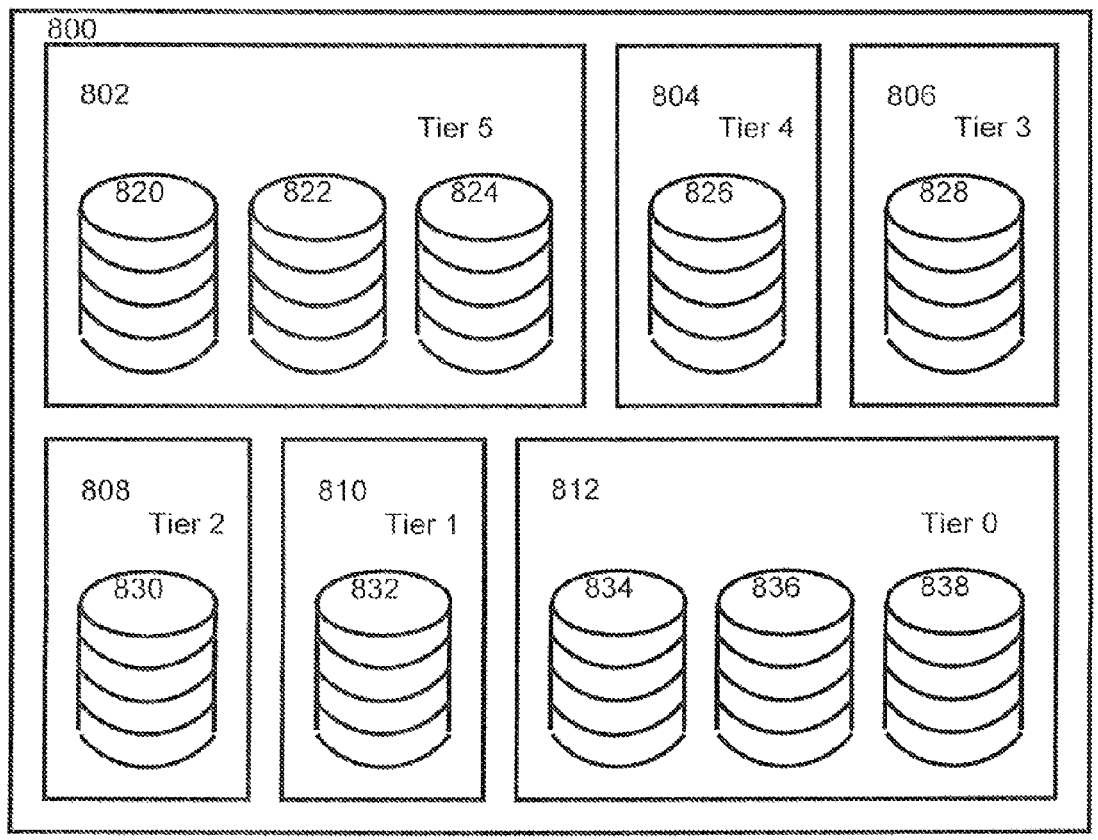
FIG. 8 shows a storage system having storage tiers suitable for use in a fourth exemplary embodiment of the present invention.

In this first embodiment the storage tiers, described later with reference to FIG. 8, are not used. The first unit of time may typically be a period of one month, but in other embodiments could be other periods, such as a week or a quarter of a year.

In a particular example, if the total number of write operations to be completed to the totality of the storage devices in a month is 600,000 and the total number of write operations that a storage device can complete before the percentage of blocks failing becomes unacceptable is 200,000, then the steady state retiral per month is 600,000/200,000, that is 3 storage devices per month. This steady state retiral rate applies regardless of how many storage devices there are in the storage system.

For example, is there are nine storage devices in the storage system, each completing one ninth (66,667) of the total number (600,000) of write operations, then each of the storage devices will reach its retiral date after three months of operation. Over the three month period, nine storage devices will reach their retiral date, giving a steady state retiral rate of three storage devices per month. Similarly, if there are ninety storage devices in the storage system, each completing one ninetieth (6,667) of the total number (600,000) of write operations, then each of the storage devices will reach its retiral date after thirty months of operation. Over the thirty month period, ninety storage devices will reach their retiral date, giving a steady state retiral rate of three storage devices per month. This second example highlights the problem of a very low number of storage devices reaching their retiral date until the thirty month time is approached and then many of the ninety storage devices reaching their retiral date around the thirty month time. In a worst case scenario, all ninety storage devices could have to be replaced in a single month.

In the above example of ninety storage devices, during the early months of the thirty month lifetime of the storage devices, the system will go into what can be termed "retiral-debt", where less drives than the desired steady state are retired each month. As the thirty month lifetime approaches, the system will go into what can be termed "retiral-credit" as more than three storage devices are retired each month. What embodiments of the present invention try to achieve is to increase the number of storage devices being retired if there is a "retiral-debt" and to decrease the number of storage devices being retired if there is a "retiral-credit". This is to be achieved whilst still "using" all of the useful write operation capacity of each of the storage devices. Each storage device is monitored as to where it is in its life-cycle and some of the storage devices are deliberately utilised more heavily in order that they reach their retiral date sooner, while other storage devices are deliberately utilised more lightly in order that they reach their retiral date later. The aim of these actions is to reach a steady state where a similar number of storage devices can be retired on a regular (i.e. monthly, weekly or daily) basis.

The aim is to smooth the number of predicted drive retirals across time. If the expected retiral time period for a drive is predicted to be overcrowded (above the steady state retiral rate) with other predicted retirals, its I/O rate can be changed, the amount of parity stored on the drive can be changed or it can be migrated to a storage pool or tier having a higher number of operations per unit time or a lower number of operations per unit of time to bring forward or to delay its retiral date.

Any proactive, pre-emptive retiral according to embodiments of this invention does not necessarily mean disposal of the storage device at retiral. The storage device could be used for some less critical use, performing mostly read operations or perhaps placed in an array that has a maximum of one 'retired' drive etc. that could be expected to fail soon.

Although the calculation above has referred to the total number of write operations (or Program/Erase cycles) that a storage device can complete before the percentage of blocks failing becomes unacceptable, the method of the embodiments of the present invention described here can be applied to storage devices having different mechanisms causing a limited lifetime, such as a limited number of read operations.

At step 206, an estimated retiral date for each storage device (820-838 in FIG. 8) retiral is calculated. To calculate this, it is necessary to know the current number of write operations per first unit of time that are being completed by the storage device, the number of write operations completed by the storage device to date and the number of write operations that can be completed before the storage device reaches its retiral date. Any, or all of these numbers may be estimates, or may be actual numbers, the accuracy of the calculated retiral date being dependent on the accuracy of the input data.

At step 208, for each date, a variable is set related to the number of storage devices reaching retiral date within a first predetermined period of the date. In a particular example, the date is a day and the first period is one half of a month. So, in this particular example, for each day, a variable is set related to the number of storage devices reaching retiral date within a half a month (earlier or later) of the day. For example, if the day was 16 Jul. 2013, then the period of one half of one month might encompass the dates between 1 Jul. 2013 and 31 Jul. 2013. The variable is effectively a "score" for each day based on the number of storage devices whose retiral date it is estimated will occur within the first period of the day. The variable may optionally include weightings for different dates. For example, if an estimated retiral date for a storage device if equal to the day, that is 16 Jul. 2013 in the above example, then a score of 15 may be used. If an estimated retiral date for a storage device is 5 days away from the day, that is 11 Jul. 2013 or 21 Jul. 2013 in the above example, then a score of 10 may be used. If an estimated retiral date for a storage device is 15 days away from the day, that is 1 Jul. 2013 or 31 Jul. 2013 in the above example, then a score of 1 may be used. Other weightings, either continuous or discrete may be used.

Figure 3:
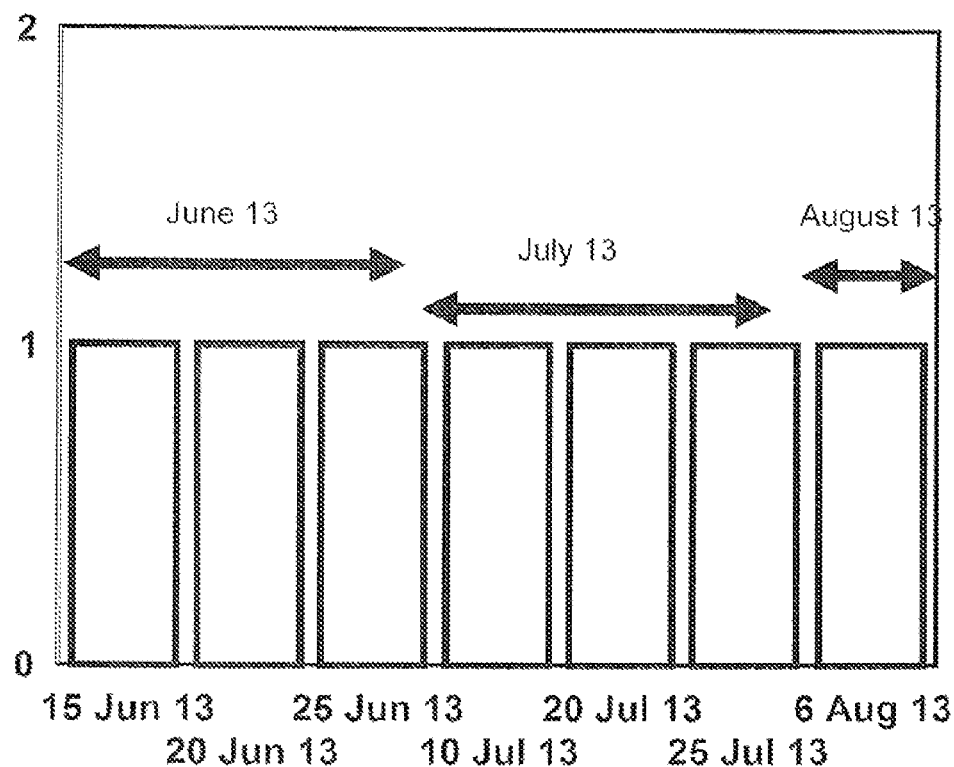
FIG. 3 is a graph showing the number of storage devices having an estimated retiral date within predetermined windows of time in a storage system having a desired steady state retiral rate.

Referring to FIG. 3, the horizontal axis shows the dates on which one or more storage devices are estimated to reach retiral date. The vertical axis shows how many storage devices are estimated to reach retiral date on that day. In the example data of FIG. 3, it can be seen that three storage devices reach retiral date in June 2013, three storage devices reach retiral date in July 2013 and one storage device reaches retiral date in early August 2013. Each day in June, July and August 2013 may be given a score, whether weighted or not, that indicates the number of storage devices estimated to reach retiral date close to that date. In the example of FIG. 3, the estimated retiral rate of three storage devices per month is equal to the desired steady state retiral rate of three storage devices per month.

Figure 4:
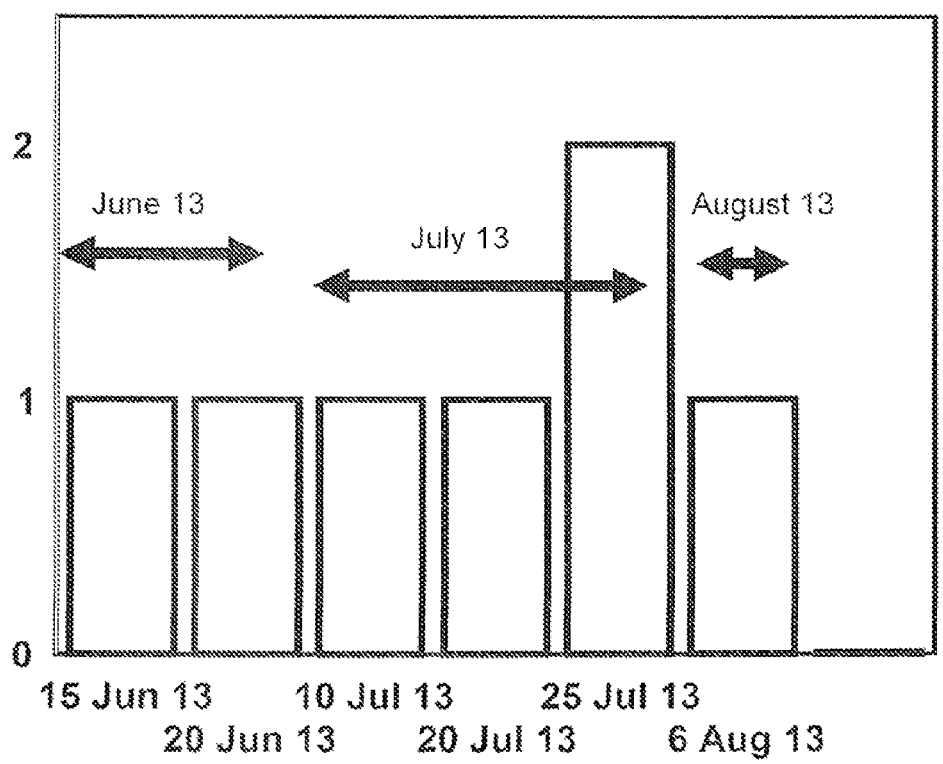
FIG. 4 is a graph showing the number of storage devices having an estimated retiral date within predetermined windows of time in a storage system having too many storage devices reaching retiral date in one month.

Referring to FIG. 4, the example data shows that two storage devices reach retiral date in June 2013, four storage devices reach retiral date in July 2013 and one storage device reaches retiral date in early August 2013. Each day in June, July and August 2013 may be given a score, whether weighted or not, that indicates the number of storage devices estimated to reach retiral date close to that date. In the example of FIG. 4, the estimated retiral rate of two storage devices in June 2013 and four storage devices in July 2013 departs from the desired steady state retiral rate of three storage devices per month. If it is possible to bring forward the retiral date of one of the storage devices reaching retiral date in July 2013 into June 2013, then the steady state retiral rate will then be equal to the desired steady state retiral rate. As stated above, this has to be achieved whilst still "using" all of the useful write operation capacity of each of the storage devices.

Figure 5:
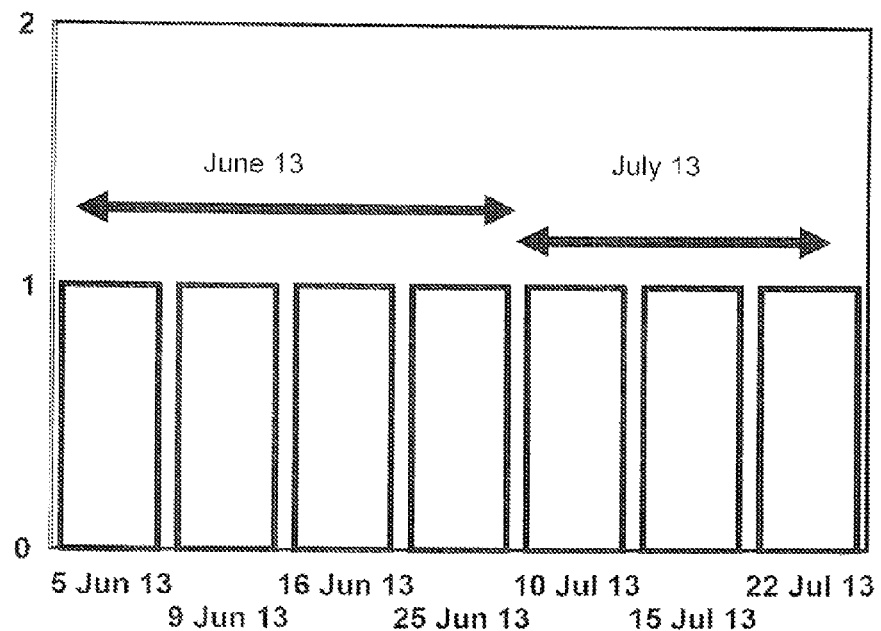
FIG. 5 is a graph showing the number of storage devices having an estimated retiral date within predetermined windows of time in a storage system where the storage device usage may be too high to allow a steady state retiral.

Referring to FIG. 5, the example data shows that four storage devices reach retiral date in June 2013 and three storage devices reach retiral date in July 2013. Each day in June 2013 and July 2013 may be given a score, whether weighted or not, that indicates the number of storage devices estimated to reach retiral date close to that date. In the example of FIG. 5, the estimated retiral rate of four storage devices in June 2013 and three storage devices in July 2013 departs from the desired steady state retiral rate of three storage devices per month. In this case the utilisation of the storage devices appears to be such that, as of a date in early June 2013, it is not possible to achieve the steady state retiral rate unless one of the June 2013 retirals can be moved into July 2013 and one of the July 2013 retiral can be moved into August 2013. This may be possible if there are not already an excess of retirals in August 2013, but it may also not be possible.

Referring again to FIG. 2, at step 210, for one or more variables associated with respective dates which correspond to a larger than the average storage device retiral per first unit of time, in a first embodiment of the present invention an action is carried out to reduce the number of storage device retirals per first unit of time. Using the example data above, for one or more variables associated with each day which is larger than the average storage device retiral per month, in a first embodiment of the present invention, an action is carried out to reduce the number of storage device retirals per month. The method of embodiments of the present invention ends at step 212.

Using the example of FIG. 4 to illustrate an action that may be carried out, the variable associated with the date of 25 Jul. 2013 is larger than the average storage device per first period, so an action needs to be taken to reduce the number of storage device retirals per month. This may be by, for example, taking an action that causes one of the storage devices estimated to retire in July 2013 to instead retire in June 2013, whilst still "using" all of the useful write operation capacity of each of the storage devices. The steady state retiral rate in June 2013 is lower than the desired steady state retiral rate.

There are criteria within which embodiments of the present invention must work. The actual profile of the I/O workload cannot be changed so there will be a set total number of writes in the system that have to be handled. This amount of storage device traffic will produce a certain total level of storage device wear. This is an advantage as it is possible to calculate the required 'steady state' of wear on the total set of storage devices and thus the ideal number of storage devices that will have to be replaced per unit time for budgetary and manpower planning purposes.

The method of embodiments of the present invention ends at step 212.

Figure 6:
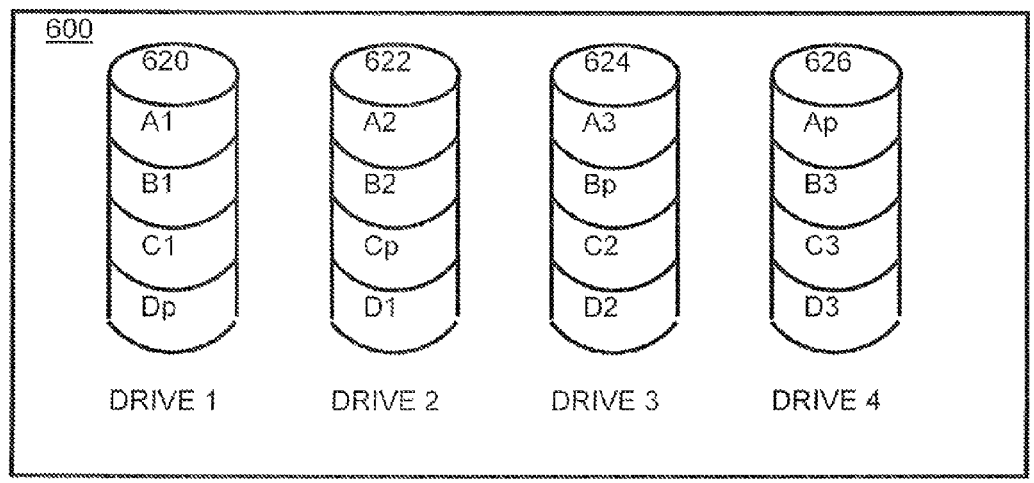
FIG. 6 shows a storage system having distributed parity suitable for use in embodiments of the present invention.

FIG. 6 shows a storage system 600 having storage drives 620-626 storing data and parity. Data in stripe A is stored on Drives 1 to 3 (620, 622, 624) with parity for stripe A being stored on Drive 4 (626). Data in stripe B is stored on Drives 1, 2 and 4 (620, 622, 626) with parity for stripe B being stored on Drive 3 (624). Data in stripe C is stored on Drives 1, 3 and 4 (620, 624, 626) with parity for stripe C being stored on Drive 2 (622). Data in stripe D is stored on Drives 2 to 4 (622, 624, 626) with parity for stripe D being stored on Drive 1 (620). A write to any one of the blocks A1, A2 or A3 of stripe A results in a write to the drive associated with the respective block A1, A2 or A3 (any one of 620, 622 or 624) and a write to the drive, Drive 4 (626), associated with the parity for stripe A. This means that typically three times the number of writes are made to Drive 4 (626) holding the parity for each block of stripe A as are made to Drives 1 to 3 (620, 622, 624) when data is written to any of the blocks in stripe A. However, in the example of FIG. 6, where there are four data stripes (A, B, C, D) and the parity for each one of the four stripes is stored on a different one of the four drives (620, 622, 624, 626), then the number of writes to each drives will, on average, be equal if the sizes of the four data stripes (A, B, C, D) are equal and if the I/O rates for each of the stripes are equal.

In a second embodiment of the present invention, the action that is carried out to reduce the number of storage device retirals per first unit of time is to increase one or more of (i) the number of writes made to a storage device so as to make it reach its retiral date earlier or (ii) to decrease the number of writes made to a storage device so as to make it reach its retiral date later. This can be achieved by migrating the parity for a stripe, or for a portion of a stripe, from a storage device for which it is desired to make reach its retiral date later to a storage device for which it is desired to make reach its retiral date earlier. As the number of writes to a storage device storing parity is higher than one that stores data, then a storage device storing a higher proportion of parity than other similar storage devices will reach its retiral date sooner. Similarly, a storage device storing a lower proportion of parity than other similar storage devices will reach its retiral date later. Typically, parity information is migrated to storage drives having a retiral date within the predetermined period (perhaps one half of a month) of the date, but before the date. Also, typically, parity information is migrated from storage drives having a retiral date within the predetermined period (perhaps one half of a month) of the date, but after the date.

When migrating parity for a stripe between storage drives some CPU time and some data bandwidth will be used, but this may only have to happen for some storage drives and a small number of times within the life span of a storage drive so this may not be significant. Such migration could be arranged to occur during a period when I/O activity to the storage system is lower.

Figure 7:
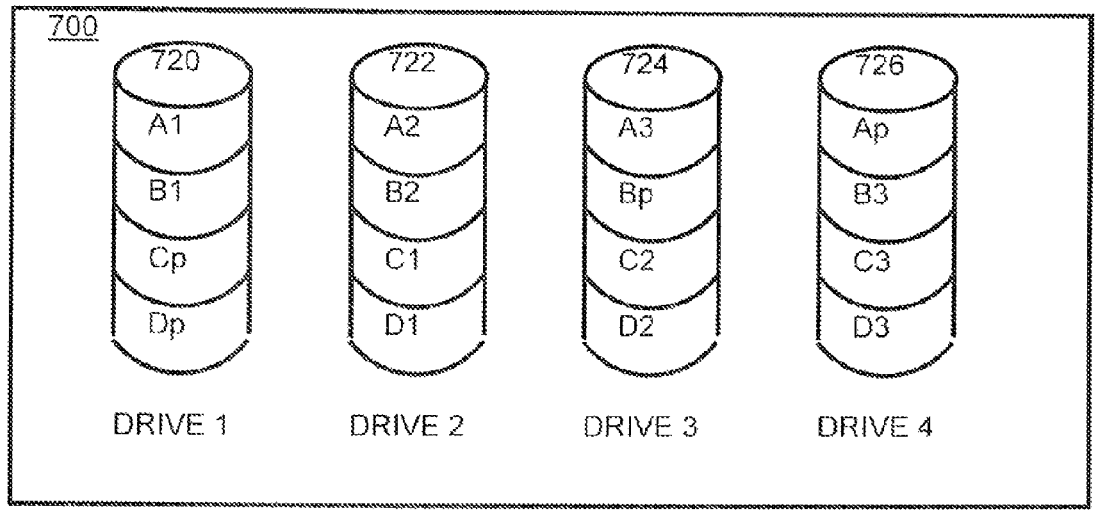
FIG. 7 shows a storage system according to a third embodiment of the present invention having distributed parity in which the distribution of parity is changed so as to achieve closer to a steady state retiral rate.

FIG. 7 shows a storage system 700 having storage drives 720-726 storing data and parity. Data in stripe A is stored on Drives 1 to 3 (720, 722, 724) with parity for stripe A being stored on Drive 4 (726). Data in stripe B is stored on Drives 1, 2 and 4 (720, 722, 726) with parity for stripe B being stored on Drive 3 (724). Data in stripe C is stored on Drives 2 to 4 (722, 724, 726) with parity for stripe C being stored on Drive 1 (720). Data in stripe D is stored on Drives 2 to 4 (722, 724, 726) with parity for stripe D being stored on Drive 1 (720). The difference between storage system 700 and the storage system 600 of FIG. 6 is that the parity for stripe C is stored on Drive 1 720 and not on Drive 2 722. This means that Drive 1 has a higher proportion of parity stored on it and Drive 2 722 has a lower proportion of parity stored on it. This means that Drive 1 will reach its retiral date sooner. Similarly, Drive 2 will reach its retiral date later.

Data blocks, extent and segments are logical units of data storage. A data block is an optimum level of storage and corresponds to a specific number of bytes. A next level of data storage is an extent which comprises a specific number of adjoining data blocks. Typically an extent can be 16, 32, 64, 128, 256, 512, 1024, 2048, 4096, or 8192 MB. A next level of data storage after an extent is a segment which comprises a number of extents. The extents in a segment may or may not be adjoining and thus extents within a segment may be moved to other locations on the same or another storage device, whilst remaining within the same extent. A segment may comprise any number of extents. When existing extents of a segment are full, another extent is allocated.

In a third embodiment of the invention, the action that is carried out to reduce the number of storage device retirals per first unit of time is to increase the number of writes made to a storage device so as to make it reach its retiral date earlier and to decrease the number of writes made to a storage device so as to make it reach its retiral date later. This can be achieved by migrating extents of data having a higher number of operations per unit of time, from a storage device for which it is desired to make reach its retiral date later to a storage device for which it is desired to make reach its retiral date earlier. Similarly extents of data having a lower number of operations per unit of time are migrated from a storage device for which it is desired to make reach its retiral date earlier to a storage device for which it is desired to make reach its retiral date later. In this third embodiment, it is optimal to migrate data at an extent level, although embodiments of the present invention may be applied at a data block level or at a segment extent level. As mentioned earlier, extents within a segment may be moved to other locations, such as to different storage devices in the same storage system, whilst remaining in the same segment.

When migrating extents between storage drives some CPU time and some data bandwidth will be used, but this may only have to happen for some storage drives and a small number of times within the life span of a storage drive so this may not be significant. Such migration may be arranged to occur during a period when I/O activity to the storage system is lower.

Referring to FIG. 8, in a fourth embodiment of the present invention, a storage system 800 has storage tiers 802-812. Storage tiers can be used to control how many data writes a storage device in a particular tier performs. In the example of FIG. 8, there are three storage devices (820, 822, 824) in tier 5 (802), one storage device (826, 828, 830, 832) respectively in each of tiers 4 to 1 (804, 806, 808, 810) and three storage devices (834, 836, 838) in tier 0 (812). There may be any combination of numbers of storage devices in any one of the tiers.

In an exemplary embodiment, tiers 5 to 0 may have utilisation levels of 100%, 75%, 55%, 40%, 30% and 0% respectively. In another exemplary embodiment, tiers 5 to 0 may have utilisation levels of 100%, 85%, 70%, 60%, 40% and 0% respectively. In these embodiments Tier 0 is reserved for unused or spare drives. In other exemplary embodiments, Tier 0 may not be used or may have no storage devices allocated to it. The utilisation levels may be set to any levels in which at least one tier having at least one storage drive has a utilisation level that differs from at least one other tier having at least one storage drive. The utilisation levels above are given as examples only.

The description of the Easy Tier function in the IBM Storwize product at http://publib.boulder.ibm.com/infocenter/storwize/ic/index.jsp?topic=/com.ibm.storwize.v70 00.doc/svc_easy_tier.html discloses the migration of data between storage devices in a storage pool to achieve a particular quality of service. Frequently accessed data is moved to storage devices having faster data access and throughput. In embodiments of the present invention, data may be similarly migrated between storage devices in a storage system in order to achieve a particular usage profile for a given storage device over its lifetime. In embodiments of the present invention, a data storage device is migrated between different storage tiers with different rates of I/O in order to achieve a set of storage devices in a data centre reaching an estimated wear level at different times. As described above, it is write operations that may be particularly relevant for certain technologies.

A particular example of the fourth embodiment will now be described. The population of storage devices is checked to see whether the estimated retiral date attributes for the drives are aligned with the retiral target for each first time period. Such checking may be at any interval and may be carried out at regular intervals or irregularly. In a particular embodiment, such checking is carried out daily. First we consider three examples of storage device usage.

1) Example where storage device usage is on track (illustrated in FIG. 3):
Calculated retiral target=3 storage devices per month
Current date=2013/06/02

| Drive List | | |
|---|---|---|
| Drive | Tier | Estimated Retiral Date (yyyy/mm/dd) |
| 01 | 5 | 2013/06/15 |
| 02 | 5 | 2013/06/20 |
| 03 | 5 | 2013/06/25 |
| 04 | 4 | 2013/07/10 |
| 05 | 3 | 2013/07/20 |
| 06 | 2 | 2013/07/25 |
| 07 | 1 | 2013/08/06 |
| 08 | 0 | unused |
| 09 | 0 | unused |
| 10 | 0 | unused |

In this example, the steady state retiral rate of 3 storage devices per month is being met and so no action is required.

2) Example where storage device usage is too even (illustrated in FIG. 4):
Calculated retiral target=3 storage devices per month
Current date=2013/06/02

| Drive List | | |
|---|---|---|
| Drive | Tier | Estimated Retiral Date (yyyy/mm/dd) |
| 01 | 5 | 2013/06/15 |
| 02 | 5 | 2013/06/20 |
| 03 | 5 | 2013/07/25 |
| 04 | 4 | 2013/07/25 |
| 05 | 3 | 2013/07/20 |
| 06 | 2 | 2013/07/10 |
| 07 | 1 | 2013/08/06 |
| 08 | 0 | unused/spare |
| 09 | 0 | unused |
| 10 | 0 | unused |

In this example, too many storage devices are expected to reach their retiral date in July 2013.

3) Example where SSD usage is too high (illustrated in FIG. 5):
Calculated retiral target=3 storage devices per month
Current date=2013/06/02

| Drive List | | |
|---|---|---|
| Drive | Tier | Estimated Retiral Date (yyyy/mm/dd) |
| 01 | 5 | 2013/06/05 |
| 02 | 5 | 2013/06/09 |
| 03 | 5 | 2013/06/16 |
| 04 | 4 | 2013/06/25 |
| 05 | 3 | 2013/07/10 |
| 06 | 2 | 2013/07/15 |
| 07 | 1 | 2013/07/22 |
| 08 | 0 | unused |
| 09 | 0 | unused |
| 10 | 0 | unused |

In this example there is no way to limit drive retiral down to the target of 3 storage devices per month without limiting throughput as there are already 3 storage devices in tier 5 (100% utilisation). In this example the goal would be to limit the number of storage devices which go "over budget" and a "retiral-credit" happens. This would also be flagged to an Administrator by way of an event being reported.

Figure 9A:
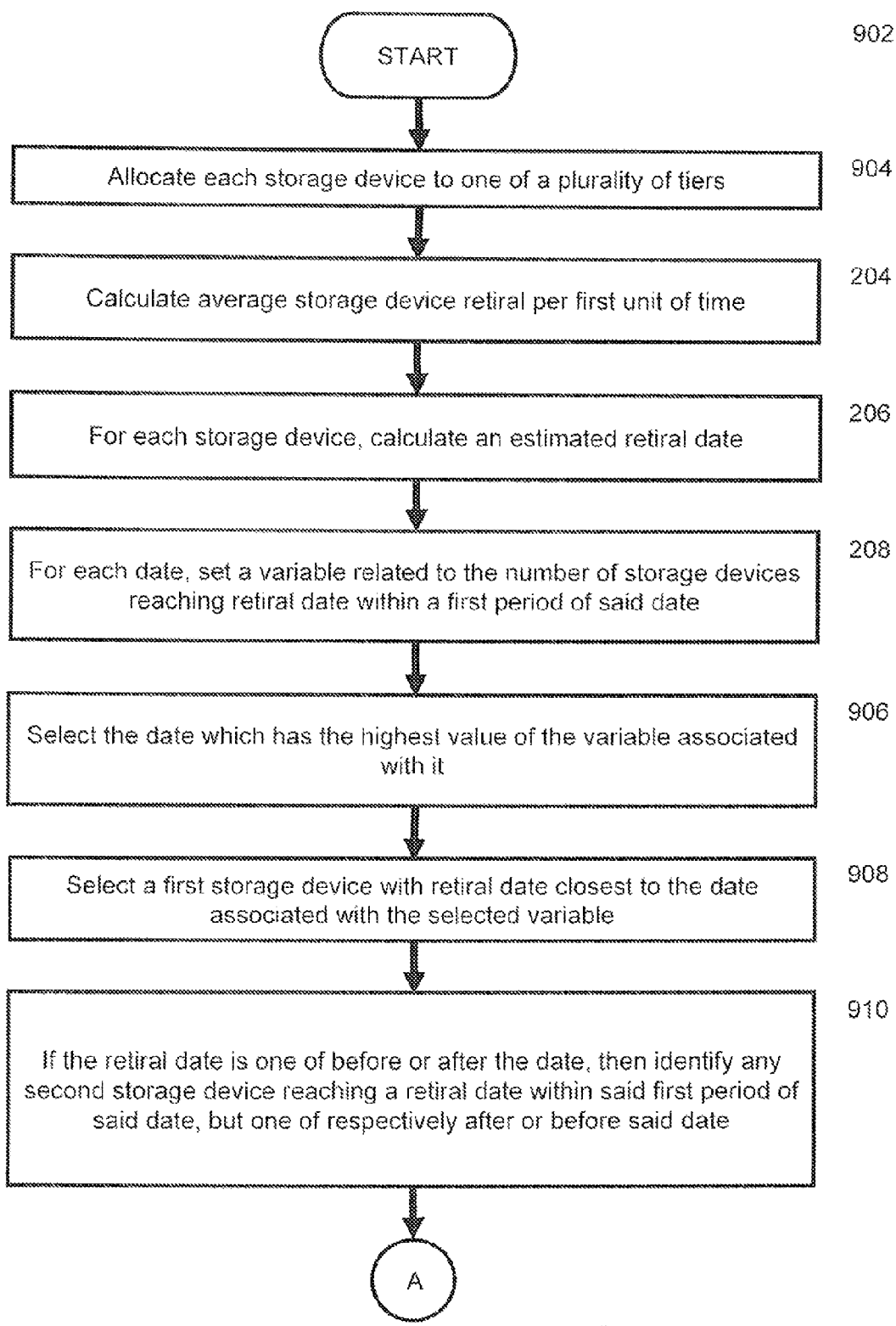
FIGS. 9A and 9B show a flow diagram of a fourth exemplary embodiment of the present invention.

The fourth embodiment will now be described in detail. Referring to FIG. 9A, the method starts at step 902. At step 904, each storage device is allocated to one of a plurality of tiers. As mentioned above, it is necessary to have at least one storage device allocated to at least two of the tiers.

The average storage device retiral per first unit of time is calculated as described at step 204 above with reference to FIG. 2. In each of the three examples above, this is three storage devices per month. The estimated retiral date for each storage device is then calculated as described above at step 206 with reference to FIG. 2. In each of the three examples above, this is shown in the column headed estimated retiral date (yyyy/mm/dd). For each date, a variable is set related to the number of storage devices reaching retiral date within a first period of a date. This has been described above at step 208 with reference to FIG. 2. In the examples above and shown in FIGS. 3 to 5, the first period is half a month and the date is a single day. For example, this may be within half a month of 16 Jul. 2013, so between 1 Jul. 2013 and 31 Jul. 2013.

Steps 906 onwards describe particular embodiments of step 210 in FIG. 2 of "For one or more variables associated with respective dates which correspond to larger than the average storage device retiral per first unit of time, carry out an action to reduce the number of storage device retirals per first unit of time". At step 906, the date which has the highest value of the variable associated with it is selected. In the examples above, this is the date that has the most retiral dates for storage devices associated with it. This is the date for which it is the most desirable to be able to move retiral dates either earlier or later in order to achieve a steady state retiral rate. At step 908, a first storage device with estimated retiral date closest to the date associated with the selected variable is selected. In the second example above this may be Drive 05 in Tier 3 which with its retiral date of 20 Jul. 2013 is closest to the single date of 16 Jul. 2013.

At step 910, if the retiral date is one of before or after the date, then identify any second storage device reaching a retiral date within said first period of said date, but one of respectively after or before said date. The purpose of this stage is to identify an appropriate candidate for a storage device exchange that will result in Drive 05 (having a retiral date after the date) moving from Tier 3 to a lower usage tier and thus retiring later and reducing the number of drives having retiral dates in the first time period, that is during July 2013. In example 2 above, we may select Drive 06 in Tier 2, which has an estimated retiral date of 10 Jul. 2013, i.e. before the date. Moving Drive 06 from Tier 2 to Tier 3 will move its estimated retiral date earlier.

Figure 9B:
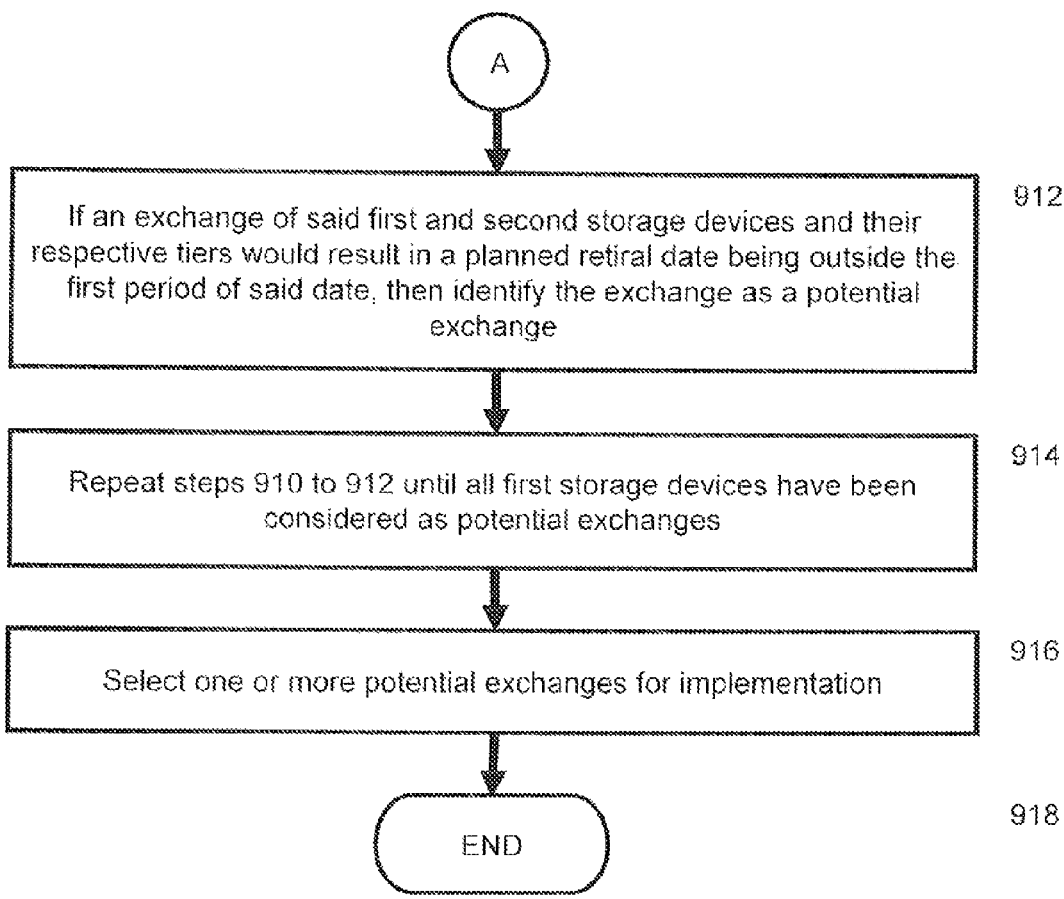

Referring to FIG. 9B, at step 912, if an exchange of said first and second storage devices, in this case Drive 05 and Drive 06, and their respective tiers, tier 3 and tier 2, would result in a planned retiral date being outside the first period of said date, that is outside July 2013, then the exchange is identified as a potential exchange. In this example, the moving of Drive 05 from higher usage Tier 3 to lower usage Tier 2 may result in the retiral date moving into August 2013. At step 914, steps 910 and 912 are repeated until all storage devices in the month having too high a retiral rate have been considered. In another embodiment, steps 910 and 912 may be repeated until the number of retirals in any time period is within an acceptable range.

At step 916, one or more of the potential exchanges identified above are implemented. It may be that a single storage device appears in more than one potential exchange. The estimated retiral dates after the exchanges can be reviewed and the optimal set of exchanges selected. The updated estimated retiral dates after the exchanges can be recorded for use in any determination as to which exchanges to complete. The method of the present invention ends at step 918.

After the method completes at step 918, there is a potential exchanges of storage devices between tiers that can be suggested to the system administrator or the exchange of storage devices between tiers can occur automatically. These actions can be implemented over a period of time in the storage system as there is no urgency to the exchanges. A before and after estimate of storage device retiral dates can be displayed or sent to an administrator to justify the proposed exchanges. For the embodiments described above involving migrations of busier extents or parity extents, similar actions, displays or messages can be implemented.

Although not illustrated in the example above, it may be that the storage device with an estimated retiral date closest to the date which has the highest number of retirals has an estimated retiral date before the date. In this case, it is the purpose of this stage to identify an appropriate candidate for a storage device exchange that will result in the storage device moving from a lower usage tier to a higher usage tier and thus cause the retiral date to be earlier and reducing the number of drives having retiral dates in the first time period, that is during July 2013. At the same time another storage device having a retiral date after the date may move from a higher usage tier to a lower usage tier and thus cause the retiral date to be later and reducing the number of drives having retiral dates in the first time period, that is during July 2013.

When migrating a storage device between tiers some CPU time and some data bandwidth may be used, but this may only have to happen for some storage drives and a small number of times within the life span of a storage drive so this may not be significant. Such migration could be arranged to occur during a period when I/O activity to the storage system is lower.

For any of the above embodiments of the invention, the system administrator can set a target for storage drive retiral over a first time period (such as a month). Alternatively, the system can suggest and display the current required steady state retiral rate if the lifetime number of reads and writes for the storage drive(s) is known.

Figure 10:
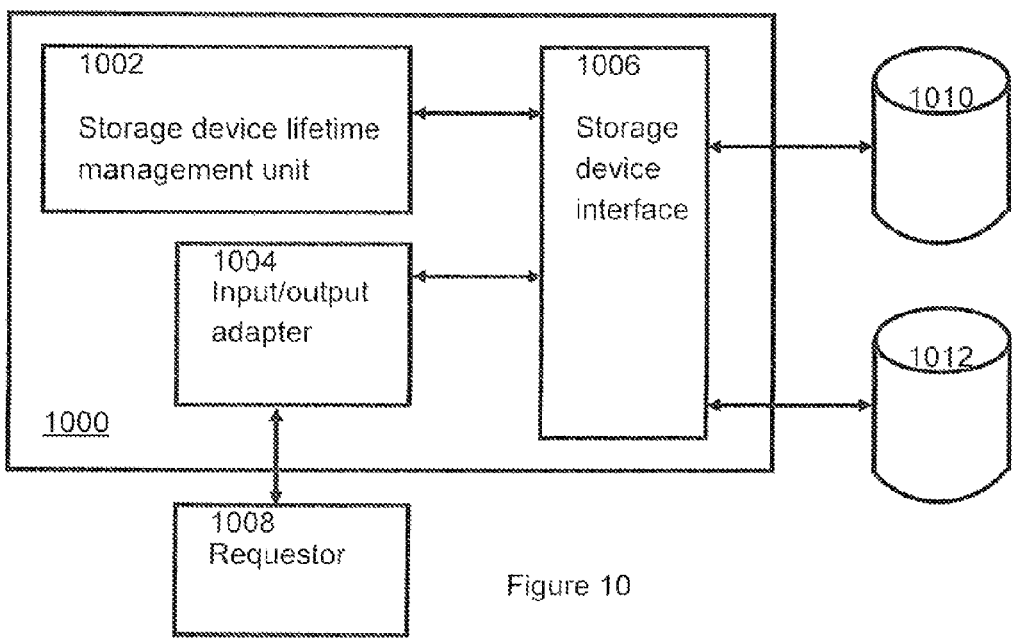
FIG. 10 shows a block diagram of a system in which the present invention may be implemented.

FIG. 10 shows a block diagram of a system in which the present invention may be implemented. The system 1000 manages a plurality of storage devices 1010, 1012, the storage devices having a lifetime of a finite number of operations. Although only two storage devices 1010, 1012 are shown in FIG. 10, typically there are many more than this. The system comprises an input/output adapter 1004 for receiving requests for data transfers to and/or from the plurality of storage devices 1010, 1012. These requests are initiated by a requestor 1008 who transfers data to the storage devices 1010, 1012 through the input/output adapter 1004 and the storage device interface 1006 and receives data from the storage devices 1010, 1012 through the storage device interface 1006 and the input/output adapter 1004. A storage device interface 1006 performs these requests for data transfers to and/or from the plurality of storage devices 1010, 1012. The person skilled in the art will be familiar with the operation of the input/output adapter 1004, the storage device interface 1006, the requestor 1008 and the storage devices 1010, 1012. A storage device lifetime management unit 1002 implementing embodiments of the present invention manages the storage devices 1010, 1012 so as to optimise the number of storage devices 1010, 1012 reaching their lifetime per first unit of time.

The storage device lifetime management unit 1002 calculates an average number of storage devices 1010, 1012 reaching their lifetime of a finite number of operations per first unit time by dividing the number of operations per first unit of time that will be executed by the plurality of storage drives by the finite number of operations supported by one of the plurality of storage devices. The storage device lifetime management unit 1002 calculates an estimated date when the finite number of operations will be reached for each one of the plurality of storage devices 1010, 1012. The storage device lifetime management unit 1002 sets a variable associated with each date, the variable being related to the number of storage devices 1010, 1012 reaching said finite number of operations within a predetermined period of said date. For one or more variables associated with a date where the value of the variable is larger than the value calculated using the date and the average number of storage devices 1010, 1012 reaching their lifetime within the predetermined period of the first unit of time, the storage device lifetime management unit carries out an action to reduce the number of storage devices reaching their lifetime per first unit of time.

Embodiments of the invention can take the form of a computer program accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-RW), and DVD.

The invention claimed is:

1. A computer-implemented method of managing a plurality of storage devices, the storage devices having a lifetime of a finite number of operations, the method comprising:
    calculating an average number of storage devices reaching said lifetime of a finite number of operations per first unit time by dividing the number of operations per first unit of time that will be executed by the plurality of storage drives by the finite number of operations supported by one of the plurality of storage devices;
    for each one of the plurality of storage devices calculating an estimated date when said finite number of operations will be reached;
    for each date, setting a variable associated with that date, the variable being related to the number of storage devices reaching said finite number of operations within a predetermined period of said date; and
    for one or more variables associated with a date where the value of the variable is larger than a value calculated using the date and said average number of storage devices reaching said lifetime within the predetermined period of said first unit of time, carrying out an action to reduce the number of storage devices reaching said lifetime per first unit of time.

2. The method of claim 1, comprising allocating each one of the plurality of storage devices to one of a plurality of usage tiers, according to how many operations per second unit of time will be executed by each one of the plurality of storage devices; and
    wherein said action to reduce the number of operations per first unit of time is to exchange a storage device allocated to a usage tier having a larger number of operations per second unit of time with a storage device allocated to a usage tier having a smaller number of operations per second unit of time.

3. The method of claim 2, wherein said step of for one or more variables associated with a date where the value of the variable is larger than the value calculated using the date and said average number of storage devices reaching said lifetime within the predetermined period of said first unit of time comprises:
    selecting the date which has the highest value of the variable associated with it;
    selecting a first storage device with retiral date closest to the date associated with the selected variable;
    if the retiral date is one of before or after the date, then identifying any second storage device reaching a retiral date within said first period of said date, but one of respectively after or before said date;
    if an exchange of said first and second storage devices and their respective tiers would result in a planned retiral date being outside the first period of said date, then identifying the exchange as a potential exchange;
    repeating said identifying steps until all first storage devices have been considered as potential exchanges; and
    selecting one or more potential exchanges for implementation.

4. The method of claim 1, wherein said action is one or more of (i) to store more parity information on storage drives reaching said lifetime of a finite number of operations within said predetermined period of said date, but before said date; or (ii) to store less parity information on storage drives reaching said lifetime of a finite number of operations within said predetermined period of said date, but after said date.

5. The method of claim 1 wherein said action is one or more of (i) to migrate extents having a higher number of operations per unit time to storage drives reaching said lifetime of a finite number of operations within said predetermined period of said date, but before said date; or (ii) to migrate extents having a lower number of operations per unit time to storage drives reaching said lifetime of a finite number of operations within said predetermined period of said date, but after said date.

6. The method of claim 1, wherein said variable associated with said date is related to the number of storage devices reaching said finite number of operations within said predetermined period of said date by weighting the number of storage devices reaching said finite number of operations by the time difference between said date and the estimated date when said finite number of operations will be reached.

7. The method of claim 1, wherein said storage devices have a lifetime of a finite number of write operations.

8. A system for managing a plurality of storage devices, the storage devices having a lifetime of a finite number of operations, the system comprising:
    an input/output adapter for receiving requests for data transfers to and/or from the plurality of storage devices;
    a storage device interface for performing said requests for data transfers to and/or from the plurality of storage devices;
    a storage device lifetime management unit for managing said storage devices so as to optimize the number of storage devices reaching said lifetime per first unit of time;
    wherein:
    said storage device lifetime management unit is configured to calculate an average number of storage devices reaching said lifetime of a finite number of operations per first unit time by dividing the number of operations per first unit of time that will be executed by the plurality of storage drives by the finite number of operations supported by one of the plurality of storage devices;
    said storage device lifetime management unit is configured to calculate an estimated date when said finite number of operations will be reached for each one of the plurality of storage devices;
    said storage device lifetime management unit sets a variable associated with each date, the variable being related to the number of storage devices reaching said finite number of operations within a predetermined period of said date;
    for one or more variables associated with a date where the value of the variable is larger than a value calculated using the date and said average number of storage devices reaching said lifetime within the predetermined period of said first unit of time, said storage device lifetime management unit is configured to carry out an action to reduce the number of storage devices reaching said lifetime per first unit of time.

9. The system of claim 8, wherein:
said storage device lifetime management unit allocates each one of the plurality of storage devices to one of a plurality of usage tiers, according to how many operations per second unit of time will be executed by each one of the plurality of storage devices; and
said action carried out by said storage device lifetime management unit is to reduce the number of operations per first unit of time is to exchange a storage device allocated to a usage tier having a larger number of operations per second unit of time with a storage device allocated to a usage tier having a smaller number of operations per second unit of time.

10. The system of claim 8, wherein said storage device lifetime management unit is configured to determine whether to carry out an action to reduce the number of storage devices reaching their lifetime per first unit of time by
said storage device lifetime management unit selecting the date which has the highest value of the variable associated with it;
said storage device lifetime management unit selecting a first storage device with retiral date closest to the date associated with the selected variable;
said storage device lifetime management unit determining if the retiral date is one of before or after the date, and identifying any second storage device reaching a retiral date within said first period of said date, but one of respectively after or before said date;
said storage device lifetime management unit determining if an exchange of said first and second storage devices and their respective tiers would result in a planned retiral date being outside the first period of said date, and responsive to said determination, identifying the exchange as a potential exchange;
said storage device lifetime management unit repeating said identifying until all first storage devices have been considered as potential exchanges; and
said storage device lifetime management unit selecting one or more potential exchanges for implementation.

11. The system of claim 8, wherein said action is one or more of (i) to store more parity information on storage drives reaching said lifetime of a finite number of operations within said predetermined period of said date, but before said date; or (ii) to store less parity information on storage drives reaching said lifetime of a finite number of operations within said predetermined period of said date, but after said date.

12. The system of claim 8 wherein said action is one or more of (i) to migrate extents having a higher number of operations per unit time to storage drives reaching said lifetime of a finite number of operations within said predetermined period of said date, but before said date; or (ii) to migrate extents having a lower number of operations per unit time to storage drives reaching said lifetime of a finite number of operations within said predetermined period of said date, but after said date.

13. The system of claim 8, wherein said variable associated with said date is related to the number of storage devices reaching said finite number of operations within said predetermined period of said date by weighting the number of storage devices reaching said finite number of operations by the time difference between said date and the estimated date when said finite number of operations will be reached.

14. The system of claim 8, wherein said storage devices have a lifetime of a finite number of write operations.

15. A computer program product for managing a plurality of storage devices, the storage devices having a lifetime of a finite number of operations, the computer program product comprising a computer readable storage medium having program instructions embodied therewith, wherein the computer readable storage medium is not a transitory signal per se, the program instructions executable by a computer to cause the computer to perform a method comprising:
calculating, by the computer, an average number of storage devices reaching said lifetime of a finite number of operations per first unit time by dividing the number of operations per first unit of time that will be executed by the plurality of storage drives by the finite number of operations supported by one of the plurality of storage devices;
calculating, by the computer, an estimated date when said finite number of operations will be reached for each one of the plurality of storage devices;
for each date, setting, by the computer, a variable associated with that date, the variable being related to the number of storage devices reaching said finite number of operations within a predetermined period of said date;
for one or more variables associated with a date where the value of the variable is larger than a value calculated using the date and said average number of storage devices reaching said lifetime within the predetermined period of said first unit of time, carrying out, by the computer, an action to reduce the number of storage devices reaching said lifetime per first unit of time.

16. The computer program product of claim 15, comprising program instructions executable by the computer to cause the computer to allocate each one of the plurality of storage devices to one of a plurality of usage tiers, according to how many operations per second unit of time will be executed by each one of the plurality of storage devices; and
wherein said action to reduce the number of operations per first unit of time is to exchange a storage device allocated to a usage tier having a larger number of operations per second unit of time with a storage device allocated to a usage tier having a smaller number of operations per second unit of time.

17. The computer program product of claim 16, wherein said step of for one or more variables associated with a date where the value of the variable is larger than the value calculated using the date and said average number of storage devices reaching said lifetime within the predetermined period of said first unit of time comprises:
selecting the date which has the highest value of the variable associated with it;
selecting a first storage device with retiral date closest to the date associated with the selected variable;
if the retiral date is one of before or after the date, then identifying any second storage device reaching a retiral date within said first period of said date, but one of respectively after or before said date;
if an exchange of said first and second storage devices and their respective tiers would result in a planned retiral date being outside the first period of said date, then identifying the exchange as a potential exchange;
repeating said identifying steps until all first storage devices have been considered as potential exchanges; and
selecting one or more potential exchanges for implementation.

18. The computer program product of claim 15, wherein said action is one or more of (i) to store more parity information on storage drives reaching said lifetime of a finite number of operations within said predetermined period of said date, but before said date; or (ii) to store less parity information on storage drives reaching said lifetime of a finite number of operations within said predetermined period of said date, but after said date.

19. The computer program product of claim 15, wherein said action is one or more of (i) to migrate extents having a higher number of operations per unit time to storage drives reaching said lifetime of a finite number of operations within said predetermined period of said date, but before said date; or (ii) to migrate extents having a lower number of operations per unit time to storage drives reaching said lifetime of a finite number of operations within said predetermined period of said date, but after said date.

20. The computer program product of claim 15, wherein said variable associated with said date is related to the number of storage devices reaching said finite number of operations within said predetermined period of said date by weighting the number of storage devices reaching said finite number of operations by the time difference between said date and the estimated date when said finite number of operations will be reached.

* * * * *